United States Patent Office 3,085,083
Patented Apr. 9, 1963

3,085,083
STABILIZED TETRAFLUOROETHYLENE-FLUORO-OLEFIN COPOLYMERS HAVING —CF$_2$H END GROUPS
Ralph Courtenay Schreyer, Wilmington, Del., assignor to E. I. du Pont de Nemours and Company, Wilmington, Del., a corporation of Delaware
No Drawing. Filed May 5, 1959, Ser. No. 811,008
16 Claims. (Cl. 260—87.5)

The present invention relates to stabilized fluorocarbon polymers, and, more particularly, to a process for stabilizing fluorocarbon polymers through end-capping and to products resulting from such an end-capping process.

Fluorocarbon polymers, such as polytetrafluoroethylene, polyhexafluoropropylene and copolymers of tetrafluoroethylene with hexafluoropropylene and/or higher perfluorinated α-olefins, are a family of resins which have outstanding chemical and physical properties. Thus, fluorocarbon polymers have outstanding thermal stability which allows their use at high temperatures. In view of the high melting points of the fluorocarbon polymers, these polymers also maintain their mechanical properties over a wide range of temperatures. Combined with high thermal stability, is the resistance of fluorocarbon polymers to corrosion and chemical attack. The outstanding thermal stability and corrosion resistance of the polymer is due to the perfluorinated carbon chain structure of the polymer molecule. A certain amount of instability, however, is introduced into the polymer through initiation and termination in the polymerization, leading to the formation of non-fluorinated end-groups. Because of the extremely high melt viscosity and molecular weight of polytetrafluoroethylene, and because of the unique techniques used in the fabrication of polytetrafluoroethylene, defects in thermal stability are not apparent in polytetrafluoroethylene as in copolymers of tetrafluoroethylene with perfluorinated α-olefins, which copolymers are suitable as plastics at substantially lower molecular weights and melt viscosities, and which can be fabricated by melt fabrication techniques generally used with plastics. The instability of the copolymers detracts from their utility since extremely high melt fabrication temperatures are necessary to injection mold and extrude these fluorocarbon copolymers. At these fabrication temperatures, ranging from 300 to 400° C., two instability factors have been noted. One factor is the change in melt viscosity which occurs during fabrication. The change in melt viscosity is large enough to interfere in the constant and even flow of the polymer at the extrusion orifice. The second type of instability observed with the melt fabricable fluorocarbon polymers is the formation of gas bubbles in the extruded product. Part of this gas formation results from volatile products formed during polymerization of the polymer, much of which can be removed through a finishing operation involving a heat treatment. However, some of this volatile gas results from continuous decomposition of the polymer end-groups, and cannot be removed through a finishing operation. The change in melt flow of the polymer during fabrication is inhibited by the addition of inorganic cationic salts which stabilize the polymer against melt viscosity changes during fabrication. Although these methods improve the stability of the polymer during melt fabrication, they do not eliminate the source of instability in the polymer, discovered to reside in the end structure of the polymer chain. The added stabilizers are, furthermore, not entirely free of stability defects of their own, such as water absorption, for example.

It is therefore an object of the present invention to provide fluorocarbon polymers having improved thermal stability and corrosion resistance. Another object is to prepare structurally modified fluorocarbon polymers. It is a further object of the present invention to provide fluorocarbon polymers having stabilized polymer chain end-groups. Still another object is to provide fluorocarbon polymers of improved processability. Yet another object of the present invention is to provide a process for introducing stable end-groups into fluorocarbon polymer chains. Still another object of the present invention is to provide a method for the stabilization of fluorocarbon polymers not involvong the addition of stabilizers. Other objects will become apparent hereinafter.

The objects of the present invention are accomplished by a process which comprises treating a fluorocarbon polymer, obtained through polymerization of a fluoroolefin having the general formula $CF_2$=$CFY$, where Y is of the class consisting of fluorine, perfluoroalkyl and omega-hydroperfluoroalkyl radicals with a peroxide catalyst, with water, preferably in the presence of inorganic compounds having a pH of at least 7, such as stable bases, basic salts and neutral salts, at a temperature of 200° C. to 400° C., and recovering a fluorocarbon polymer having at least half of all the end-groups in the form of difluoromethyl groups.

In accordance with the present invention, it was discovered that the carboxylate end-groups in the fluorocarbon polymer chain are the principal cause of the instability of fluorocarbon polymer found to occur at melt fabrication temperatures. Carboxylate end-groups in the fluorocarbon polymer are formed when the polymerization is initiated through a peroxide catalyst, or when the polymerization is terminated through the formation of a vinyl bond which is subsequently oxidized. The initiation with a peroxide catalyst gives rise to the formation of an oxygen-carbon difluoride bond. This group is unstable and will hydrolyze in the presence of even the smallest traces of water to form a carboxylic acid group, also referred to herein as a carboxylate group. When this group is heated to the fabrication temperature, it decomposes, carbon dioxide is released, and a vinyl bond is formed in the polymer chain. This vinyl bond, at the elevated temperatures, may react further to either attach to an existing polymer chain, and thereby increase the melt viscosity, or to add oxygen to form an acid fluoride group (—COF), which, in turn, then can be hydrolyzed to form the carboxylate end-group again. Since it is extremely difficult to eliminate all oxygen and moisture from the environment of the polymer, most polymerizations even being carried out in an aqueous phase, these reactions become a repeating cycle resulting in the increase in melt viscosity of the polymer and in the build-up of volatile components, such as $CO_2$, $COF_2$ and HF, in the polymer. Since the polymerization is initiated by the peroxide catalyst, it is clear that at least half of the polymer chain end groups have the carboxylate structure. The amount, however, can be greater than half in that the vinyl end-group, resulting from termination of the polymerization, can also be converted into a carboxylate end-group, and in that termination can also occur through molecular combination.

It was further found that the degradation resulting from the formation of carboxylate groups can be avoided by treating the polymer at elevated temperatures with water. Treatment with water at elevated temperatures causes decarboxylation, but is also accompanied by the formation of a substantial number of highly stable —CF$_2$H groups. In order to achieve the formation of the stable —CF$_2$H group, it is necessary that the carboxylate end-group be in ionic form. The formation of the —CF$_2$H group occurs when the polymer is treated with water alone at the temperatures described, but the substantial conversion of carboxylate end-groups is slow.

The formation of these stable end-groups is increased by the addition of bases, neutral or basic salts to either the aqueous phase or to the polymer. It is believed that the increased rate of formation of stable —$CF_2H$ end-groups through the addition of these compounds is due to the effect of these compounds on the ionization of the carboxylate end-groups leading to the formation of the carboxylate anion.

In order to cause the reaction of the carboxylate anion with the water, the environment in which the polymer is reacted should contain at least 2% by weight of the environment of water. The environment may be gaseous in nature or liquid. Thus, it is possible to heat the water polymer mixture in the form of aqueous slurry or to treat the polymer with steam; the concentration of the water may be reduced to the point where the polymer is actually treated with humidified air, as long as the humidity is greater than 0.02 lb. of water per lb. of air.

The compounds which enhance the formation of the carboxylate anions are, in general, inorganic compounds soluble in water, having a pH of greater than 7, i.e., stable bases and neutral or basic salts. Bases which are suitable are bases which are stable at the reaction temperatures employed in the process of the present invention and include, in particular, ammonium, alkali metal and alkaline earth metal hydroxides. The salts which are useful in facilitating the formation of the carboxylate anion are the neutral and basic salts of such acids as nitrogen, sulfur, halogen, phosphorus, arsenic, boron and silicon acids. The salts which are suitable are those which are thermally stable at the reaction temperatures employed. Thus, the salts included are nitrates, nitrites, sulfates, sulfites, bisulfites, halides, halogenates, halogenites, phosphates, phosphites, hypophosphites, perphosphates, arsenates, silicates and borates. The cationic components of the salt can be any metal or other cation capable of forming a slightly water-soluble and ionizable salt, but is preferably a metal of group I–A and group II–A of the periodic table. Examples of salts capable of facilitating the formation of the carboxylate anion in the polymer chain are sodium chloride, sodium sulfate, sodium nitrate, sodium nitrite, sodium phosphate, sodium arsenate, sodium borate, potassium chloride, potassium bromate, potassium chlorate, calcium fluoride, calcium iodide, magnesium bromide, magnesium sulfate, magnesium phosphate, barium chloride, barium nitrate, and the like.

The quantity in which the base or the salt is employed is not critical, since, as described above, the process of the present invention can be carried out in the absence of any salt or base. Thus, the concentration of the base or the salt may be as low as 5 parts per million based on the polymer. However, the concentration of the salt to be most effective in the formation of $CF_2H$ groups is preferably between 100 and 600 parts per million based on the polymer, and the concentration of the base is preferably from .01% to 10% by weight of the aqueous phase contacted with the polymer. In view of the low concentration of salts and bases necessary to enhance the formation of the carboxylate anion in the polymer, it is clear that the salt or base employed need not be highly dissociated or highly soluble in water.

In general, two techniques may be employed to carry out the end-capping of the perfluorocarbon polymers in accordance with the present invention. These two processes can be characterized as slurry-capping and vapor-capping. In the slurry-capping process the polymer is admixed with sufficient water to create an aqueous slurry and is then heated, under sufficient pressure to maintain the aqueous phase in the liquid form, to the reaction temperatures above 200° C. The salt or the base, if employed, is dissolved in the liquid phase. In the vapor-capping process, the base or salt, if employed, is mixed with the polymer, the polymer is then heated to the reaction temperature and moisture is passed over and through the polymer by means of a carrier gas such as air. Instead of moisture in a carrier, steam may also be employed.

The rate at which the polymer is capped depends on the reaction conditions employed. Thus, higher temperatures tend to increase the capping rate. Similarly, increasing the quantity of the added salt or base increases the rate of the capping reaction; also a high concentration of the aqueous phase in the environment will increase the rate of the —$CF_2H$ group formation. The completion of the reaction, i.e., the transformation of substantially all of the carboxylate end-groups to —$CF_2H$ end-groups can be determined readily by infrared techniques described hereinbelow.

The process of the present invention is applicable to all types of fluorocarbon polymers obtained through polymerization with a peroxide catalyst or containing a terminal vinyl group. The latter being transformed into a carboxylate group through oxidation and hydrolysis. Although the stability of polytetrafluoroethylene may be improved by the process of the present invention, the improvement is only of a lesser significance, since polytetrafluoroethylene has an extremely high molecular weight and extremely high melt viscosity so that there are fewer carboxylate end-groups contributing to instability, which, furthermore, does not become apparent due to the already existing high melt viscosity of the polymer. Furthermore, the polymer is fabricated by methods differing from those generally employed with plastics. Changes in melt viscosity of the polymer do not affect the utilization of these methods. The end-capping process of the present invention is particularly effective for the stabilization of fluorocarbon polymers obtained through the copolymerization of tetrafluoroethylene and perfluorinated α-olefins. Perfluorinated α-olefins which copolymerize with tetrafluoroethylene are such olefins as perfluoropropylene, perfluorobutene-1, perfluoropentene-1, perfluorohexene-1 and higher substituted perfluorinated α-olefins. The process is also applicable to copolymers of tetrafluoroethylene and omega-hydroperfluoro-α-olefins, such as omega-hydroperfluoroheptene-1 and omega-hydroperfluorodecene-1. Since the process of the present invention relates to the stabilization of fluorocarbon polymers through the transformation of carboxylate and vinyl end-groups, it is clear that the utility of the invention does not depend on the nature of the fluorocarbon polymer, but principally on the nature of the end-groups in the fluorocarbon polymer. Regardless of which monomers are employed, if the polymerization is initiated by a peroxide, the process of the present invention is applicable, since through the use of peroxides at least half of the polymer end-groups are carboxylate end-groups. Similarly, if the polymerization is terminated through the formation of a vinyl end-group, the process of the present invention is also applicable and will lead to the formation of fluorocarbon polymers having increased stability.

The existence and the quantity of the carboxylate end-groups and the vinyl end-groups in a fluorocarbon polymer is determined by the infrared spectrum of the polymer, generally obtained from a cold pressed, unmodified sample of the polymer, after it has been separated from the polymerization reactor and carefully dried. Thus, carboxylate end-groups were found to absorb in the infrared spectrum at 2.81 microns, 3.25 microns, 5.52 microns and 5.62 microns. The 2.81 micron band measures the free hydroxyl groups of the carboxylate end-group in the polymer; the 3.25 micron band measures the bonded hydroxyl group; the 5.52 micron band measures the free carbonyl group in the polymer; and the 5.62 micron band measures the bonded carbonyl group in the polymer. As indicated by these four bands, the carboxylate group can exist in either monomeric form or in dimeric form; in the latter, the hydroxyl group of one carboxylate end-group is hydrogen bonded to the carbonyl oxygen of a second carboxyl end-group. The quantitative measurement of the number of carboxylate end-groups is obtained by measuring the extinction coefficient of carboxylate end-group-containing model compounds and transferring this coefficient to the measurements obtained on the polymer. In a similar manner the acid fluoride end-group, —COF, may be obtained by absorbance of the polymer at the 5.3 micron band, the vinyl group by absorbance at 5,56 micron band, and the resulting stable —CF$_2$H end-group, obtained by the process of the present invention, by absorbance at the 3.32 micron band.

The stability of a fluorocarbon polymer during melt fabrication may be measured by a number of tests. A preferred test comprises the measurement of the change in melt viscosity when the polymer is exposed for a period of time to high temperatures, either in the presence or absence of oxygen. The term "specific melt viscosity" as used herein, means the apparent melt viscosity as measured at 380° C. under a shear stress of 6.5 pounds per square inch. Specific melt viscosity is determined by using a melt indexer of the type described in ASTM D–1238–52–T, modified for corrosion resistance to embody a cylinder, orifice, and a piston weighing 10 grams, made of Stellite cobalt-chromium-tungsten alloy. The resin is charged to the 0.375 inch I.D. cylinder which is held at 380° C.±0.5° C. allowed to come to an equilibrium temperature during 5 minutes, and extruded through the 0.0825 inch diameter, 0.315 inch long orifice under a piston loading of 5000 grams. The specific melt viscosity in poises is calculated as 53,150 divided by the observed extrusion rate in grams per minute. The stability of the polymer may also be measured by the volatiles index. In this test, a 10 g. sample of the resin is placed in an aluminum foil thimble, which is charged into a glass vial attached to a vacuum system. The vial is evaluated to 2 mm. (Hg) and then on reaching an equilibrium placed in a hot block maintained at 380° C. The change in pressure is recorded every ten minutes over a period of 60 minutes. The sample is cooled and the weight loss is obtained. The volatiles index is calculated by the following equation $$V.I. = \frac{(P_{40} - P_0) \times V}{10}$$

where $P_{40}$ and $P_0$ are the pressures of the sample in mm. prior to insertion and after 40 min. in the hot block and V is the volume of the vial.

A further method for measuring the stability of the polymer comprises extruding the polymer at 380° C. into a sheet and measuring the number of bubbles in the extruded product per unit area.

The process of the present invention is further illustrated by the following examples.

EXAMPLE I

Into a 320 ml. stainless steel autoclave was charged 75 g. of wet polymer fluff, obtained from the copolymerization of tetrafluoroethylene and hexafluoropropylene with a potassium persulfate catalyst in an aqueous medium, said fluff containing 25 g. of a copolymer of tetrafluoroethylene and hexafluoropropylene, the hexafluoropropylene content of the copolymer being 14–16 weight percent. To the fluff was added 100 ml. of a 28% aqueous ammonia solution. The autoclave was heated to 250° C. under autogenous pressure and agitated at that temperature for a period of two hours. The resulting polymer and part of the original polymer were dried in a vacuum oven at a temperature of 250° C. for a period of 18 hours. The resulting products are compared in Table I.

Table I

| Property | Ammonia treated polymer | Untreated polymer |
|---|---|---|
| End group analysis by infrared/10$^6$ carbon atoms: | | |
| —CO$_2$H (monomeric) | 0 | 177 |
| —CO$_2$H (dimeric) | 1 | 212 |
| —COF | 0 | |
| —CF$_2$=CF$_2$ | 0 | |
| —CF$_2$H | 380 | 0 |
| Specific melt viscosity (poises): | | |
| Original | 3.2×10$^4$ | 39×10$^4$ |
| After 1 hr. exposure in air at 380° C | 3.2×10$^4$ | 150×10$^4$ |
| Volatiles index | 45 | 110 |

This table shows the increased stability both in respect to melt viscosity and in respect to volatiles obtained by the treatment with aqueous ammonia.

The example was repeated with 1% solution of aqueous ammonia. Infra-red analysis showed substantially complete removal of the carboxylate end-groups.

EXAMPLE II

Into a 320 ml. stainless steel autoclave was charged 25 g. of a copolymer of tetrafluoroethylene and hexafluoropropylene, containing 14–16 weight percent of hexafluoropropylene, in the form of 75 g. of wet fluff, 1 g. of sodium hydroxide and 100 ml. of water. The autoclave was heated to 200° C. under autogenous pressure and agitated at that temperature for a period of one hour. Infrared spectrographic analysis of the resulting dried, end-capped copolymer showed the disappearance of all of the carboxylate end-groups, the original concentration of which was 177 carboxylate end-groups in the monomeric form and 212 carboxylate end-groups in the dimeric form per 10$^6$ carbon atoms in the polymer. The specific melt viscosity of the end-capped copolymer remained constant on exposure to air at 380° C. for a period of one hour, whereas the specific melt viscosity of the uncapped copolymer increased fourfold.

EXAMPLE III

Into a 320 ml. stainless steel autoclave was charged 100 ml. of water and 25 g. of the copolymer of tetrafluoroethylene and hexafluoropropylene described in Example II, in the form of 75 g. of wet fluff to which 500 p.p.m. of sodium sulfate had been added. The copolymer was heated for one hour at 250° C. under autogenous pressure with agitation. The experiment was repeated and the polymer was heated for 8 hours. The following results were obtained.

Table II

| | Infrared end-groups/10$^6$ carbon atoms | | | | |
|---|---|---|---|---|---|
| | —CO$_2$H monomeric | —CO$_2$H dimeric | —COF | —CF=CF$_2$ | —CF$_2$H |
| Untreated copolymer | 177 | 212 | | | |
| Copolymer after 1 hr. end-capping | 84 | 29 | 1 | 32 | 172 |
| Copolymer after 8 hr. end-capping | 0 | 18 | 0 | 4 | 296 |

EXAMPLE IV

Into a stainless steel tube, 2 inches in diameter and 24 inches long, was charged 40 g. of a copolymer of tetrafluoroethylene and hexafluoropropylene containing 15 weight percent of hexafluoropropylene, to which had been added the amount of sodium sulfate indicated in Table III. The tube and contents were heated to a temperature of 260° C., and air containing 0.05 to 0.1 lb. of water per lb. of air was passed over the polymer for a period indicated in the table. The volatiles index of the polymer was measured. Results using various salt concentrations at various exposure times are summarized in the table and compared to the untreated copolymer. The untreated and end-capped copolymer was further subjected to infrared spectrographic analysis to determine the change in the structure of the copolymer.

Table III

| Ex. | Na$_2$SO$_4$ content in p.p.m. | Exposure time | Volatiles index | Infrared —CF$_2$H groups/10$^6$ C atoms | Infrared —CO$_2$H groups/10$^6$ C atoms |
|---|---|---|---|---|---|
| IV-A | 400 | 1 | 57 | 350 | Non-measurable. |
| IV-B | 5 | 1 | 59 | 315 | Do. |
| IV-C | 400 | 2 | 47 | 614 | Do. |
| IV-D | 5 | 2 | 45 | 578 | Do. |
| IV-E | 400 | 4 | 44 | 666 | Do. |
| IV-F | 5 | 4 | 45 | 417 | Do. |
| IF-G | | | 105 | None | 600. |

EXAMPLE V

Into a circulating air oven were placed samples of a copolymer of tetrafluoroethylene and hexafluoropropylene containing 15 weight percent of hexafluoropropylene in the form of fluff. The copolymer had been washed repeatedly to remove any inorganic materials in the polymer. The polymer was then subjected to the treatments indicated in Table IV and analyzed as to the composition of the end-groups. The stability of the polymer was determined by volatiles index, change of volatiles index on aging, and change of specific melt viscosity through exposure to air at 380° C. for 1 hour. As can be seen from this data, stabilization of the copolymer can be accomplished in the substantial absence of a salt. The table further shows that a mere heat treatment of the polymer, although causing some formation of —CF$_2$H groups, does not form a sufficient number thereof to obtain the stabilization observed with the fluorocarbon polymers of the present invention.

Similar results as shown in Tables I to IV and in the examples, are obtained when the concentration of hexafluoropropylene in the copolymer is varied to as low as 3%, and to as high as 35%, or when, instead of the hexafluoropropylene-, perfluoropentene-1-, omega-hydroperfluorohexene-1- and perfluorononene-1 copolymers with tetrafluoroethylene are employed in the described procedures.

conversion of carboxylate end-groups to —CF$_2$H end-groups. It will, therefore, be apparent that the process of the present invention is applicable to the stabilization of all fluorocarbon polymers and is independent of the type of fluorocarbon monomer employed or the molecular weight of the product formed. However, the invention finds its primary utility in the stabilization of fluorocarbon polymers of sufficiently high molecular weight to be identified as plastics. High molecular weight fluorocarbon polymers are solid resins which can be cold-drawn and thereby distinguished from low molecular weight waxes and greases. High molecular weight fluorocarbon polymers contain at least 1000 carbon atoms in the polymer chain and generally have molecular weights exceeding 10,000. The carboxylate end-group, —CF$_2$COOM, where M may be a metal, but generally is hydrogen, is formed when the fluorocarbon monomer is polymerized with a peroxide catalyst. In view of the fact that the polymerization of these fluorocarbon monomers occurs through addition polymerization, the carboxylate groups are formed only at the ends of a polymer chain. Due to the initiation of the polymerization through peroxide, giving rise to a —O—CF$_2$— bond, at least one half of the terminal groups of the fluorocarbon chain of the polymer are carboxylates. Since termination of the polymerization may occur through combination of growing polymer chains or through reactions with the peroxide, it is feasible to have a much higher percentage of carboxylate end-groups than half of all the end groups. The end-capping process described herein converts substantially all of the carboxylate end-groups to —CF$_2$H groups, and thereby causes the increase in stability. The fluorocarbon polymers stabilized by the process of the present invention are prepared by techniques established in the art. In general, the formation of high molecular weight polymers occurs by polymerization in an aqueous medium employing a peroxide catalyst.

The fluorocarbon polymers obtained by the process of the present invention find utility in any industrial plastic application requiring outstanding corrosion resistance, high temperature stability, superior electrical insulating properties, chemical inertness, toughness or any combination of such properties. The end-capped fluorocarbon polymers of the present invention may be employed in all applications heretofore developed for fluorocarbon poly- Table IV

| Treatment | Infrared analysis of end-groups in percent ||||| Volatile index || Specific melt viscosity in poises ×10$^4$ |
|---|---|---|---|---|---|---|---|---|
| | —COOH(M) | —COOH(D) | —COF | —CF=CF$_2$ | —CF$_2$H | Before aging | After aging [1] | After 1 hr. at 380° C. in air |
| Untreated polymer | 50 | 50 | | | | 110 | | 39 | 160 |
| 6 hr. at 260° C. in air oven at water concentration of 0.1 lb. H$_2$O/lb. air. | | | | | 0.4 | 88 | 25 | 21 | 8.98 | 8.7 |
| 4 hr. at 350° C. in air oven at water concentration of .04 lb. H$_2$O/lb. air. | 0.5 | 0.6 | 0.1 | 2.0 | 50 | 21 | 20 | 6.0 | 7.8 |
| 4 hr. at 350° C. in air oven at concentration of less than 0.01 lb./H$_2$O/lb. of air. | 0.6 | | 16 | 19 | 22 | 34 | 51 | 9.88 | 24.82 |

[1] Polymer is heated at 100° C. under 100 p.s.i. oxygen and 14.7 p.s.i. partial pressure of water for a period of 22 hours.

The above examples have shown the conversion of carboxylate end-groups of perfluorocarbon polymers to difluoromethyl end-groups and the increased thermal stability of fluorocarbon polymers resulting from this end-capping process. The examples are intended to illustrate and are not to be construed as limiting the invention. Various modifications of the process will be apparent to those skilled in the art. The stabilization obtained by the process of the present invention is not affected by the polymer structure along the chain, but depends on the mers. The polymer is, furthermore, fabricated into foils and fibers of improved thermal stability.

I claim:
1. A solid, cold-drawable copolymer of tetrafluoroethylene and a fluoroolefin having the general formula

$$CF_2=CFY$$

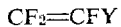

where Y is a perfluoroalkyl radical having from 1 to 8 carbon atoms, said copolymer having a molecular weight in excess of 10,000, at least half of the end-groups of said copolymer having been converted from the original end-groups to groups of the formula—$CF_2H$, as measured by infrared analysis.

2. The product of claim 1 wherein Y of the fluoroolefin having the general formula $CF_2=CFY$ is a perfluoroalkyl radical having from 1 to 8 carbon atoms.

3. The product of claim 1 wherein the copolymer is a copolymer of tetrafluoroethylene and hexafluoropropylene.

4. The product of claim 1 in film form.

5. The product of claim 1 in funicular form.

6. The process of improving the thermal stability of a solid, cold-drawable fluorocarbon copolymer of tetrafluoroethylene and a fluoroolefin having the structure $CF_2=CFY$ where Y is a member of the class consisting of perfluoroalkyl and omega-hydroperfluoroalkyl radicals, said radicals having from 1 to 8 carbon atoms, said copolymer having a molecular weight in excess of 10,000 and having at least half of the molecular end-groups in the form of carboxylate end-groups, which comprises contacting said copolymer in finely divided, loose unsintered form with water, the concentration of said water being at least 2% by weight of the copolymer environment, at a temperature of 200 to 400° C., for a period sufficient to remove substantially all of the carboxylate end-groups and recovering a fluorocarbon copolymer in which at least half of the molecular end-groups, as measured by infrared analysis, have the structure —$CF_2H$.

7. The process as set forth in claim 6 wherein the water treatment is carried out in the presence of a stable, inorganic compound having a pH value when dissolved in water of at least 7.

8. The process as set forth in claim 7 wherein the inorganic compound having a pH value when dissolved in water of at least 7 is an inorganic base.

9. The process as set forth in claim 7 wherein the inorganic base is aqueous ammonia.

10. The process as set forth in claim 7 wherein the inorganic base is sodium hydroxide.

11. The process as set forth in claim 7 wherein the inorganic compound having a pH value when dissolved in water of at least 7 is a neutral salt.

12. The process as set forth in claim 11 wherein the neutral salt is sodium sulfate.

13. The process as set forth in claim 7 wherein the fluorocarbon polymer is a copolymer of tetrafluoroethylene and hexafluoropropylene.

14. The process of improving the thermal stability of a solid, cold-drawable fluorocarbon copolymer of tetrafluoroethylene and a fluoroolefin having the structure $CF_2=CFY$ where Y is a member of the class consisting of perfluoroalkyl radicals and omega-hydroperfluoroalkyl radicals, said radicals having from 1 to 8 carbon atoms, said copolymer having a molecular weight in excess of 10,000 and having at least half of the molecular end-groups in the form of carboxylate end-groups, which comprises adding to said copolymer 1 to 600 p.p.m. of an inorganic salt having a pH value when dissolved in water of at least 7 and being stable at the reaction temperature, and then contacting the copolymer in a finely divided, loose unsintered form with vaporized water at a concentration of at least 2% by weight of the copolymer environment, at a temperature of 200 to 400° C., for a period sufficient to remove all of said end-groups and recovering a fluorocarbon copolymer in which at least half of the molecular end-groups, as measured by infrared analysis, have the structure —$CF_2H$.

15. The process as set forth in claim 14 wherein the fluorocarbon polymer is a copolymer of tetrafluoroethylene and hexafluoropropylene.

16. The process as set forth in claim 15 wherein the salt is sodium sulfate.

References Cited in the file of this patent

UNITED STATES PATENTS

| | | |
|---|---|---|
| 2,392,389 | Joyce | Jan. 8, 1946 |
| 2,695,880 | Benning et al. | Nov. 30, 1954 |
| 2,700,661 | Miller | Jan. 25, 1955 |
| 2,881,156 | Pilar et al. | Apr. 7, 1959 |
| 2,888,446 | Herbst et al. | May 26, 1959 |
| 2,902,477 | Fischer et al. | Sept. 1, 1959 |
| 2,955,099 | Mallouk et al. | Oct. 4, 1960 |

OTHER REFERENCES

Gaylord et al.: Linear and Stereoregular Addition Polymers, page 463 (1959), Interscience Pub., Inc. N.Y.

UNITED STATES PATENT OFFICE
CERTIFICATE OF CORRECTION

Patent No. 3,085,083            April 9, 1963

Ralph Courtenay Schreyer

It is hereby certified that error appears in the above numbered patent requiring correction and that the said Letters Patent should read as corrected below.

Column 5, line 37, for "evaluated" read -- evacuated --; columns 7 and 8, Table IV, for the two sub-column headings reading "$-CF=CF^2$", and "$-CF^2H$" read -- $-CF=CF_2$ --, and ---$CF_2H$ --; same Table IV, last entry in the last column for "24.82" read -- 24.72 --.

Signed and sealed this 22nd day of October 1963.

(SEAL)
Attest:

ERNEST W. SWIDER
Attesting Officer

EDWIN L. REYNOLDS

Acting Commissioner of Patents